(12) United States Patent
Lu

(10) Patent No.: US 7,512,730 B2
(45) Date of Patent: Mar. 31, 2009

(54) METHOD FOR DYNAMICALLY ALLOCATING INTERRUPT PINS

(75) Inventor: Ying-Chih Lu, Taipei (TW)

(73) Assignee: Inventec Corporation, Taipei (TW)

( * ) Notice: Subject to any disclaimer, the term of this patent is extended or adjusted under 35 U.S.C. 154(b) by 164 days.

(21) Appl. No.: 11/675,464

(22) Filed: Feb. 15, 2007

(65) Prior Publication Data

US 2008/0147947 A1 Jun. 19, 2008

(30) Foreign Application Priority Data

Dec. 15, 2006 (TW) ............... 95147060 A

(51) Int. Cl.
G06F 9/46 (2006.01)
(52) U.S. Cl. ..................... 710/266; 710/260
(58) Field of Classification Search .......... 710/260–269
See application file for complete search history.

(56) References Cited

U.S. PATENT DOCUMENTS

| | | | |
|---|---|---|---|
| 6,006,301 A * | 12/1999 | Tetrick ....................... | 710/260 |
| 6,704,823 B1 * | 3/2004 | Perez et al. ................. | 710/260 |
| 7,287,112 B1 * | 10/2007 | Pleis et al. .................. | 710/269 |
| 2003/0145147 A1 * | 7/2003 | Alexander et al. .......... | 710/260 |
| 2005/0060460 A1 * | 3/2005 | Karamatas et al. .......... | 710/260 |
| 2005/0125583 A1 * | 6/2005 | Shih ........................... | 710/260 |
| 2006/0265537 A1 * | 11/2006 | Chen .......................... | 710/269 |

OTHER PUBLICATIONS

PCI Express Base Specification Revision 1.1; Section 6.1, pp. 273-277; PCI Special Interest Group (PCI-SIG); Mar. 28, 2005.*

* cited by examiner

Primary Examiner—Glenn A Auve
(74) Attorney, Agent, or Firm—J.C. Patents

(57) ABSTRACT

A method for dynamically allocating interrupt pins is provided. The present method is used for allocating a plurality of interrupt pins of a control chip. In the present method, a hardware routing table is read first and a plurality of slots that have used the interrupt pins is found out from the hardware routing table. These slots are sorted according to the number of interrupt pins used by each slot. Then, from the slot in the first order of the sequence, the interrupt pins are allocated for a plurality of registers in the control chip corresponding to these slots by turns. The allocation is repeated once the last interrupt pin is allocated until all the registers for the slots are allocated with an interrupt pin.

10 Claims, 5 Drawing Sheets

| PCI Slot | Interrupt messages corresponding to interrupt pins | Interrupt routing register (Rx_A, Rx_B, Rx_C, Rx_D) |
|---|---|---|
| Slot#1 | INTA | 1 |
| Slot#2 | INTB, C | 2,3 |
| Slot#3 | INTD, A, B | 4,1,2 |
| Slot#4 | INTC, D, A, B | 3,4,1,2 |

| PCI Slot | Interrupt messages corresponding to interrupt pins | Interrupt routing register (Rx_A, Rx_B, Rx_C, Rx_D) |
|---|---|---|
| Slot#1 | INT A,B,C,D | 1,2,3,4 |
| Slot#2 | INT D, A, B, C | 4,1,2,3 |
| Slot#3 | INT C, D, A, B | 3,4,1,2 |
| Slot#4 | INT B, C, D, A | 2,3,4,1 |

FIG. 2 (PRIOR ART)

| PCI Slot | Interrupt messages corresponding to interrupt pins | Interrupt routing register (Rx_A, Rx_B, Rx_C, Rx_D) |
|---|---|---|
| Slot#1 | INT A | 1 |
| Slot#2 | INT A, B | 1,2 |
| Slot#3 | INT A, B, C | 1,2,3 |
| Slot#4 | INT A, B, C, D | 1,2,3,4 |

FIG. 3 (PRIOR ART)

| PCI Slot | Interrupt messages corresponding to interrupt pins | Interrupt routing register (Rx_A, Rx_B, Rx_C, Rx_D) |
|---|---|---|
| Slot#1 | INTA | 1 |
| Slot#2 | INTB, C | 2,3 |
| Slot#3 | INTD, A, B | 4,1,2 |
| Slot#4 | INTC, D, A, B | 3,4,1,2 |

FIG. 5

| Interrupt pin | Shared number | Number of linked drivers | linking sequence of drivers |
|---|---|---|---|
| Pin 1 | 3 | 3 | Slot#1.A→Slot#3.B→Slot#4.C |
| Pin 2 | 3 | 3 | Slot#2.A→Slot#3.C→Slot#4.D |
| Pin 3 | 2 | 2 | Slot#2.B→Slot#4.A |
| Pin 4 | 2 | 2 | Slot#3.A→Slot#4.B |

FIG. 6

| PCI Slot | Interrupt messages corresponding to interrupt pins | Interrupt routing register (Rx_A, Rx_B, Rx_C, Rx_D) |
|---|---|---|
| Slot#1 | INTA | 1 |
| Slot#2 | INTB, D | 2, 4 |
| Slot#3 | INTC, A, B | 3, 1, 2 |
| Slot#4 | INTC, D, A, B | 3, 4, 1, 2 |

FIG. 7

| Interrupt pin | Shared number | Number of linked drivers | linking sequence of drivers |
|---|---|---|---|
| Pin 1 | 3 | 3 | Slot#1.A→Slot#3.B→Slot#4.C |
| Pin 2 | 3 | 3 | Slot#2.A→Slot#3.C→Slot#4.D |
| Pin 3 | 2 | 2 | Slot#3.A→Slot#4.A |
| Pin 4 | 2 | 2 | Slot#2.B→Slot#4.B |

METHOD FOR DYNAMICALLY ALLOCATING INTERRUPT PINS

CROSS-REFERENCE TO RELATED APPLICATION

This application claims the priority benefit of Taiwan application serial no. 95147060, filed Dec. 15, 2006. All disclosure of the Taiwan application is incorporated herein by reference.

BACKGROUND OF THE INVENTION

1. Field of the Invention

The present invention relates to a routing method. More particularly, the present invention relates to a method for dynamically allocating interrupt pins.

2. Description of Related Art

An interrupt request (IRQ) is used to inform and request a processor to suspend when an apparatus performs a specific action, so as to execute a corresponding calculation. The IRQ is sent via so-called interrupt lines, and the number of the interrupt lines varies depending on an interrupt controller adopted by a mainboard. A conventional computer uses a programmable interrupt controller (PIC) having 16 interrupt lines. However, these interrupt lines are still far from enough for computers with increasingly advancing functions and I/O devices. Most of the interrupt lines are occupied and even shared by several hardware devices. Therefore, some new mainboards adopt an advanced programmable interrupt controller (APIC) for managing over 32 IRQs which can be used by more hardware apparatuses while avoiding the share of interrupt lines.

A mainboard adopting PIC usually only has four available interrupt lines for a PCI bus to use. In another aspect, a new mainboard adopting APIC has eight available interrupt lines. Consequently, although there are six PCI slots on the mainboard, they can only use these four or eight IRQs. Moreover, accelerated graphics port (AGP), universal serial bus (USB), redundant array of independent disks (RAID) controller, and some on-board local area network (LAN) interfaces, 1394 interface, and serial ATA (SATA) interface all should utilize IRQs. Thus, it is inevitable that several PCI slots share one IRQ.

FIG. 1 shows a hardware configuration of a conventional PIC/IOAPIC mainboard. Referring to FIG. 1, a conventional PIC mainboard is configured to have a CPU 110, a north bridge chip 120, a south bridge chip 130, and four PCI slots 140, 150, 160, 170. The PCI slots 140, 150, 160, and 170 respectively transmit four interrupt messages INTA/INTB/INTC/INTD to interrupt routing registers Rx_A, Rx_B, Rx_C, Rx_D (x=1, 2, 3, 4) on the north bridge chip 120. As the PIC mainboard only supports four IRQs, the PCI slots 140, 150, 160, and 170 share four interrupt lines to send out interrupt messages while the north bridge chip 120 actually transmits the interrupt messages to the south bridge chip 130. The south bridge chip 130 receives the interrupt messages transmitted by the north bridge chip 120 with four interrupt router registers RA, RB, RC, RD respectively. These interrupt messages are then transmitted to a PIC (8259 PIC), and the 8259 PIC forwards an IRQ to the CPU 110. It should be noted that the conventional IOAPIC mainboard has an extra IOAPIC as compared with the PIC mainboard, and meanwhile forwards an IRQ to the CPU 110 by the use of the 8259 PIC and IOAPIC.

FIG. 2 is a conventional routing configuration table of interrupt pins. Referring to FIG. 2, pins A, B, C, D of each PCI slot are corresponding to different interrupt messages INTA/INTB/INTC/INTD, and a basic input/output system (BIOS) is also corresponding to different interrupt messages INTA/INTB/INTC/INTD when executing a power-on self test (POST), so as to configure the used/shared IRQs. For example, the pins A, B, C, D of Slot #2 are corresponding to the interrupt messages INTD/INTA/INTB/INTC. Therefore, during the configuration of the IRQs, numerals 4, 1, 2, 3 are stored in the corresponding interrupt routing registers Rx_D, Rx_A, Rx_B, Rx_C (x=1, 2, 3, 4) in sequence.

If a PCI interface card is inserted in each of the above four PCI slots, and each PCI interface card must triggers four interrupts from interrupt pins 1, 2, 3, 4 respectively, each IOAPIC interrupt line is shared by four hardware apparatuses, and the number of the drivers of the hardware apparatus serially linked on the four interrupt lines are four. Therefore, under such circumstance, each IOAPIC interrupt line is shared in the same way, which is the optimal situation.

However, if a PCI interface card is inserted in each of the four PCI slots, and each PCI interface card must use the interrupt pins as shown in FIG. 3, the problem of nonuniform allocation of interrupt pins may occur. For example, the interrupt pin A is shared by four PCI slots, but the interrupt pin D is only used by one PCI slot. At this time, the allocation of the IOAPIC interrupt line is not optimal, which may result in a situation that some interrupt pins are busily engaged while some others are quite free. Therefore, such situation has much room for improvement.

SUMMARY OF THE INVENTION

Accordingly, the present invention is directed to provide a method for dynamically allocating interrupt pins, wherein the interrupt pins are uniformly allocated according to the number of the interrupt pins used by each slot, thereby optimizing the allocation of the interrupt pins.

As embodied and broadly described herein, the present invention provides a method for dynamically allocating interrupt pins. The present method is used to allocate a plurality of interrupt pins of a control chip. The present method comprises the following steps. A hardware routing table is read first and a plurality of slots that have used the interrupt pins is found out from the hardware routing table. These slots are sorted according to the number of interrupt pins used by each slot. Then, from the slot in the first order of the sequence, the interrupt pins are allocated for a plurality of registers in the control chip corresponding to these slots by turns. The allocation is repeated once the last interrupt pin is allocated until all the registers for the slots are allocated with an interrupt pin.

In the method for dynamically allocating interrupt pins according to a preferred embodiment of the present invention, each slot is configured with a hardware apparatus having an interface card.

In the method for dynamically allocating interrupt pins according to a preferred embodiment of the present invention, drivers of the hardware apparatuses disposed on the slots are linked in series according to the sequence of the interrupt pins allocated to each slot.

In the method for dynamically allocating interrupt pins according to a preferred embodiment of the present invention, if the specification of the hardware apparatus disposed on a certain slot only allows a fixed interrupt pin, the number of the fixed interrupt pins is subtracted from the number of the interrupt pins required by the slot before the sorting of the slots.

In the method for dynamically allocating interrupt pins according to a preferred embodiment of the present invention, the fixed interrupt pin is preserved for the register of the corresponding slot, the interrupt pins are allocated by turns, and once the allocation goes to the fixed interrupt pin, skip the fixed interrupt pin.

In the method for dynamically allocating interrupt pins according to a preferred embodiment of the present invention, the interrupt pins are connected to a PIC or an I/O advanced programmable interrupt controller (IOAPIC).

In the method for dynamically allocating interrupt pins according to a preferred embodiment of the present invention, the slots are sorted in an ascending order according to the number of the interrupt pins used by the slots.

In the method for dynamically allocating interrupt pins according to a preferred embodiment of the present invention, the control chip is a north bridge chip or a south bridge chip, and the slots are one of Peripheral Component Interconnect (PCI) bus slots, Peripheral Component Interconnect Express (PCI-E) bus slots (PCI Express is a registered trademark of PCI-SIG), and industry standard architecture (ISA) bus slots.

The present invention adopts a structure of uniformly allocating interrupt pins after sorting the slots that have used the interrupt pins, so as to avoid nonuniform allocation of resources resulting from one interrupt pin being shared by several slots. Moreover, after the allocation of the interrupt pins, the drivers of the hardware apparatuses disposed on the slots are linked in series according to the sequence of the interrupt pins allocated to each slot, so as to provide interrupt pins for specific slots preferentially, thus solving the problem of interrupt processing delay as the interrupt pins are occupied by other slots.

In order to make the aforementioned and other objectives, features, and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2 is a conventional routing configuration table of the interrupt pins.

FIG. 3 is a conventional routing configuration table of the interrupt pins.

FIG. 5 is an allocation table of the PCI slots according to a preferred embodiment of the present invention.

FIG. 6 is an allocation table of the interrupt pins according to a preferred embodiment of the present invention.

FIG. 7 is an allocation table of the PCI slots according to another preferred embodiment of the present invention.

FIG. 8 is an allocation table of the interrupt pins according to another preferred embodiment of the present invention.

DESCRIPTION OF EMBODIMENTS

In order to optimize the allocation of the interrupt pins, the present invention dynamically adjusts the value of the registers on the control chip according to the situation of the interrupt pins used in a current system plug-in card during the POST of the BIOS, such that the number of the slots shared by each interrupt pin is reduced to the minimum. To make the content of the present invention more apparent, embodiments are particularly given below as examples of the present invention that can be practically implemented.

Figure 1:
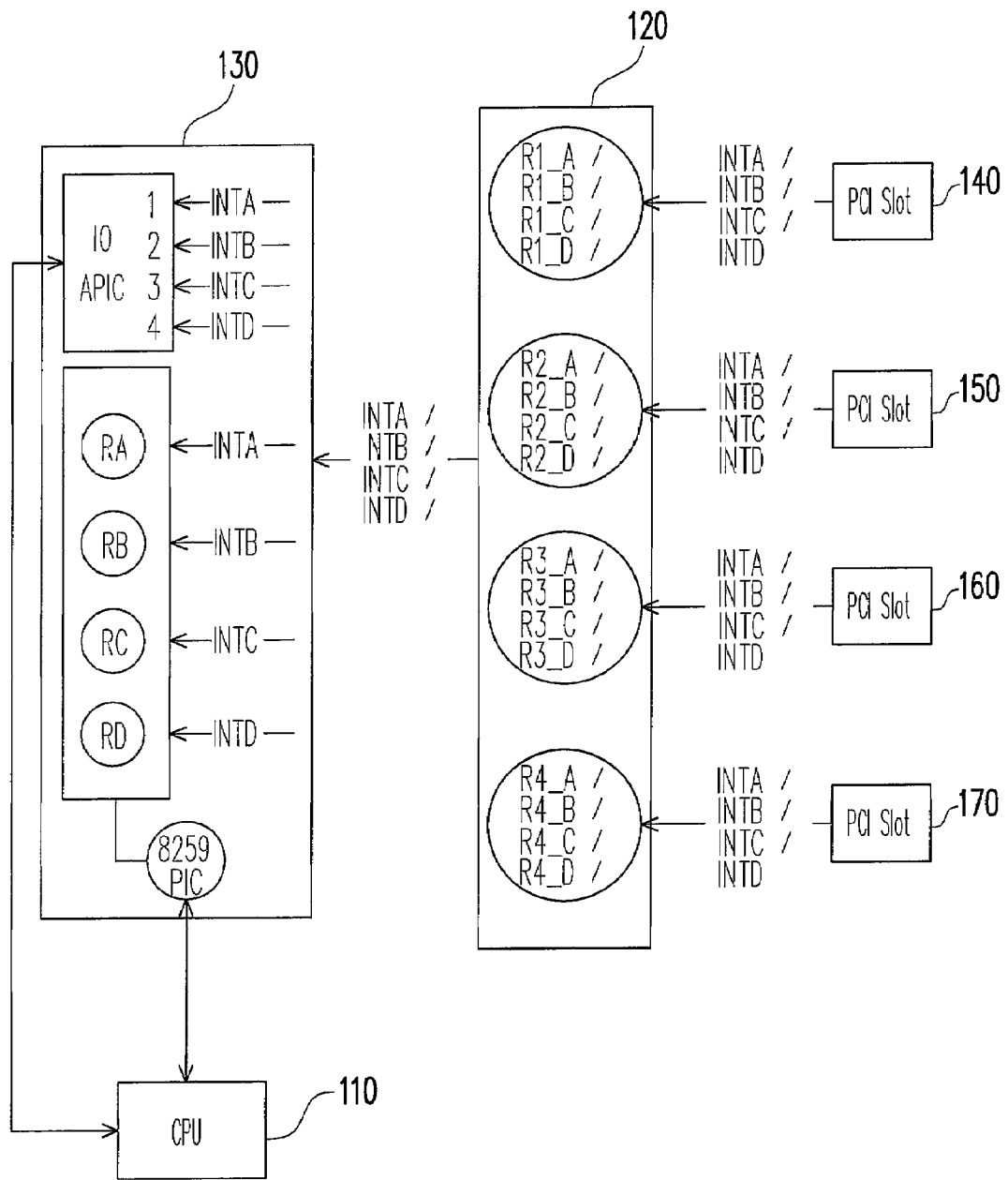
FIG. 1 shows a hardware configuration of a conventional PIC/IOAPIC mainboard.
Figure 4:
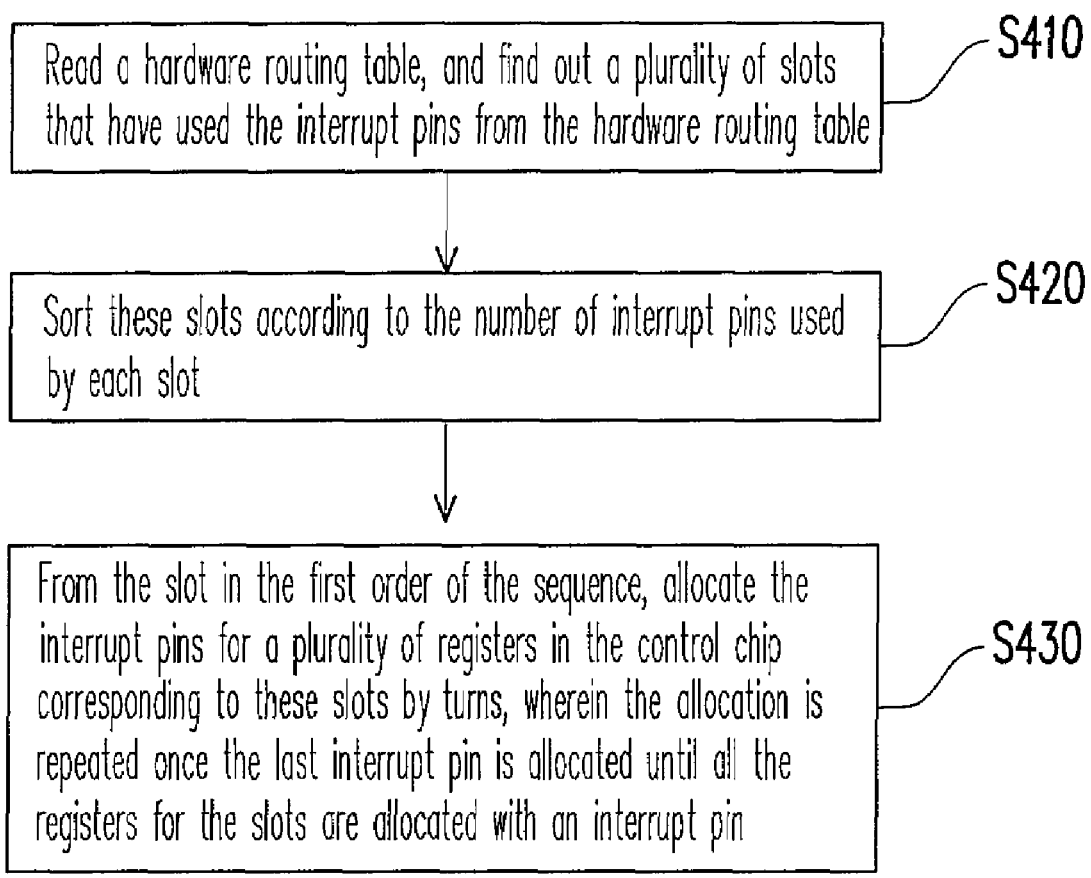
FIG. 4 is a flow chart of the method for dynamically allocating interrupt pins according to a preferred embodiment of the present invention.

FIG. 4 is a flow chart of the method for dynamically allocating interrupt pins according to a preferred embodiment of the present invention. Referring to FIG. 4, this embodiment is suitable for allocating a plurality of interrupt pins of a control chip, wherein the control chip is, for example, a north bridge chip or a south bridge chip, and the interrupt pins are, for example, connected to a PIC or an IOAPIC.

In this embodiment, a hardware routing table of the system is read first, and the configuration data of all the hardware in the system is recorded in the table. Thus, the table can be used to find out which slot in the system disposed with a plug-in card as well as the situation of the interrupt pins used by the plug-in card (S410). In addition, the plug-in card is an interface card, such as a sound card, display card, or I/O card. The slots are, for example, but not limited to, PCI bus slots, PCI-E bus slots, or ISA bus slots. In the above step, it can be acquired which slots must use interrupt pins and how many interrupt pins are used by these slot.

Next, the slots are sorted according to the number of the interrupt pins used by the slots (S420), wherein the sorting is carried out, for example, in an ascending order. If two or more slots use the interrupt pins of the same number, the sorting is performed from the slot originally in the first order of the sequence. For example, if the number of the interrupt pins used by Slots #2 and #3 is two, Slot #2 is sorted first.

After the sorting of the slots, from the slot in the first order of the sequence, the interrupt pins are allocated for a plurality of registers in the control chip corresponding to each slot by turns. The allocation is repeated once the last interrupt pin is allocated until all the registers for the slots are allocated with an interrupt pin (S430).

For example, it is assumed that there are four slots #1, #2, #3, #4, and the number of the interrupt pins used by the slots is 1, 2, 3, 4 in sequence. Therefore, if the four slots are sorted according to the number of the interrupt pins, the sorting result is Slots #1, #2, #3, #4, and the following allocation of the interrupt pins also starts from Slot #1.

FIG. 5 is an allocation table of the PCI slots according to a preferred embodiment of the present invention. Referring to FIG. 5, the second column indicates the interrupt messages corresponding to the interrupt pins allocated to each slot, and the interrupt pins corresponding to each slot are listed from the second row of the table according to the sorting result. Slot #1 is in the first order, and needs only one interrupt pin, thus being allocated with an interrupt pin PinA. Next, Slot #2 is in the second order, and needs two interrupt pins, thus being allocated with interrupt pins PinB, PinC, and so forth. The allocation process is repeated until Slot #4 in the last order is allocated with interrupt pins.

In the third column of FIG. 5, values of the interrupt routing registers Rx_A, Rx_B, Rx_C, Rx_D (x=1, 2, 3, 4) in the control chip corresponding to each slot are listed, which are written into the corresponding interrupt routing registers in the control chip during the POST of the BIOS, so as to designate the previously allocated interrupt pins to the corresponding slots.

It should be noted that besides the above step of allocating the interrupt pins, after the interrupt pins are allocated, the present invention further links the drivers of the hardware apparatuses disposed on the slots in series according to the sequence of the interrupt pins allocated to each slot. Similarly, in the example of FIG. 5, referring to FIG. 6, the times that each interrupt pin is shared, the number of the drivers linked in series, and the linking sequence of the drivers are listed. As shown in FIG. 6, the linking sequence of the drivers for the interrupt pin PinA is Slot #1.A→Slot #3.B→Slot #4.C, which is corresponding to the allocated positions of the interrupt message INT A in FIG. 5.

According to the above linking sequence of the drivers, the performance of the allocation result of the interrupt pin is calculated. However, each time an interrupt occurs, it is required to query the drivers one by one according to the linking sequence of the drivers so as to determine which one sends out the interrupt. If the interrupt is sent by the driver serially linked in the first order of the sequence, it can be determined after querying once. If the interrupt is sent by the driver serially linked in the second order of the sequence, the query must be carried out twice (including the first and second drivers), and so forth. The sum of the times of queries carried out on all the serially-connected drivers stands for the time spent for determining which one sends out the interrupt in the interrupt pins.

In the example of FIG. 6, the number of the serially linked drivers corresponding to the interrupt pins PinA, PinB, PinC, and PinD is 3, 3, 2, 2. Thus, the times of the queries for determining which one sends out the interrupt in each interrupt pin are 1+2+3=6, 1+2+3=6, 1+2=3, 1+2=3, and the total query times are 6+6+3+3=18. Compared with the conventional example in FIG. 3, 20 times of queries are required for the conventional allocation result. Therefore, the allocation result acquired by using the allocation method of the present invention is at least 10% faster than the conventional one.

It should be noted that the above calculation method calculates the performance of the allocation result based on the presupposition that the times of sending out interrupt of each interrupt pin are the same. Definitely, those skilled in the art can also add a weight value appropriately to acquire a more precise analysis result according to the times of interrupt sent by each interrupt pin.

Further, it should be noted that for some interface card, fixed interrupt pins must be used according to the characteristics. For example, if a recording card needs an IRQ when playing or recording a file, the IRQ of the record card is not processed immediately as the interrupt pins are occupied by other interface cards, and the recording card has to wait until the interrupt controller queries to determine which one sends out the IRQ. As a result, the record card may lose a sample, thus causing an interference such as noises or pop noises.

The present invention also has a corresponding method to solve the above problem. That is, when the specification of the hardware apparatus disposed on a certain slot only allows the fixed interrupt pin, the number of the fixed interrupt pins is subtracted from the number of the interrupt pins required by the slot before the sorting of the slots. Moreover, during the allocation of the interrupt pins in practice, the fixed interrupt pin is preserved for the register of the corresponding slot, and when the interrupt pins are allocated by turns, once the allocation goes to the fixed interrupt pin, the fixed interrupt pin is skipped. Finally, the drivers of the hardware apparatuses disposed on the slots are serially linked according to the sequence of the interrupt pins allocated to each slot. By the above method, the driver of a specific hardware apparatus with a "real-time demand" is serially linked in the first order of the sequence. Whenever the interrupt pins send out IRQs, the driver that the system queries first is the specific hardware apparatus. Therefore, the IRQ sent out by the specific hardware apparatus is responded in real time, thus avoiding the delay or degradation of the performance of the specific hardware apparatus.

For example, FIG. 7 is an allocation table of the interrupt pins according to another preferred embodiment of the present invention. Referring to FIG. 7, the difference between this embodiment and the previous one is that Slot #2 must use the second interrupt pin and Slot #3 must use the third interrupt pin. Accordingly, in this embodiment, the slots are sorted after the number of the "specific interrupt pins" is subtracted from the number of the interrupt pins needed by the slots. Seen from FIG. 7, after deducting the second interrupt pin, the number of the interrupt pin used by Slot #2 is one, and after deducting the third interrupt pin, the number of the interrupt pin used by Slot #3 is two. Then, after being sorted according to the number of the interrupt pins, the sequence of each slot is still Slot #1, Slot #2, Slot #3, Slot #4. At this time, the interrupt pins are allocated. From the first interrupt pin, as the first interrupt pin is not occupied, the first interrupt pin is allocated to Slot #1. However, when the second interrupt pin is allocated, as being occupied by Slot #2, the second interrupt pin is skipped and the allocation process is proceeded to allocate the third interrupt pin. Because the third interrupt pin is occupied by Slot #3, the third interrupt pin is skipped and the allocation process is proceeded to allocate the fourth interrupt pin. As the fourth interrupt pin is not occupied, the fourth interrupt pin is allocated to Slot #2. In this manner, the interrupt pins are continued to be allocated to the rest slots until all the interrupt routing registers corresponding to the slots are allocated with an interrupt pin.

After the interrupt pins are allocated, the drivers of the hardware apparatuses disposed on the slots are linked in series according to the sequence of the interrupt pins allocated to each slot. Referring to FIG. 8, the linking sequence of the drivers for the interrupt pin PinA is still Slot #1.A→Slot #3.B→Slot #4.C. Further, the linking sequence of the drivers for the interrupt pin PinB is still Slot #2.A Slot #3.C Slot #4.D. However, the linking sequence of the drivers for the interrupt pin PinC is changed to be Slot #3.A→Slot #4.A. That is to say, the interrupt pin PinC can be preferentially used by Slot #3 and will not be occupied by other slots to cause delay.

In view of the above, the method for dynamically allocating interrupt pins according to the present invention has at least the following advantages.

1. The interrupt pins are uniformly allocated to each slot, so as to prevent one interrupt pin shared by several slots at the same time, thus avoiding nonuniform resource allocation.

2. The uniform allocation of the interrupt pins can reduce the times for querying the drivers of the hardware apparatus, thus enhancing the efficiency of the interrupt processing.

3. According to the request of the slot that especially needs interrupt pins preferentially, the drivers of the hardware apparatuses disposed on the slot are serially linked in the first order of the sequence, thus avoiding the interrupt pin being occupied by other slots or preventing the query time being too long, so as to cause interrupt processing delay.

Though the present invention has been disclosed above by the preferred embodiments, they are not intended to limit the present invention. Anybody skilled in the art can make some modifications and variations without departing from the spirit and scope of the present invention. Therefore, the protecting range of the present invention falls in the appended claims.

What is claimed is:

1. A method for dynamically allocating interrupt pins, used for allocating a plurality of interrupt pins of a control chip, the routing method comprising:

reading a hardware routing table, and finding out a plurality of slots that have used the interrupt pins from the hardware routing table;

sorting these slots according to the number of interrupt pins used by each slot; and allocating the interrupt pins for a plurality of registers in the control chip corresponding to these slots by turns from the slot in a first order of a sequence of the slots, wherein the allocation is repeated once the last interrupt pin is allocated until all the registers for the slots are allocated with an interrupt pin.

2. The method for dynamically allocating interrupt pins as claimed in claim 1, wherein each slot is configured with a hardware apparatus.

3. The method for dynamically allocating interrupt pins as claimed in claim 2, wherein each hardware apparatus comprises an interface card.

4. The method for dynamically allocating interrupt pins as claimed in claim 2, further comprising:

linking a plurality of drivers of the hardware apparatuses disposed on the slots according to a sequence of the interrupt pins allocated to each slot.

5. The method for dynamically allocating interrupt pins as claimed in claim 2, wherein if the specification of the hardware apparatus disposed on a certain slot only allows a fixed interrupt pin, the number of the fixed interrupt pins is subtracted from the number of the interrupt pins required by the slot before the sorting of the slots.

6. The method for dynamically allocating interrupt pins as claimed in claim 5, when the interrupt pins are allocated, further comprising:

preserving the fixed interrupt pin for the register of the corresponding slot; and allocating the interrupt pins by turns, and skipping the fixed interrupt pin once the allocation goes to the fixed interrupt pin.

7. The method for dynamically allocating interrupt pins as claimed in claim 1, wherein the interrupt pins are connected to a programmable interrupt controller (PIG) or an I/O advanced programmable interrupt controller (IOAPIC).

8. The method for dynamically allocating interrupt pins as claimed in claim 1, wherein the slots are sorted in an ascending order according to the number of the interrupt pins used by the slots.

9. The method for dynamically allocating interrupt pins as claimed in claim 1, wherein the control chip is a north bridge chip or a south bridge chip.

10. The method for dynamically allocating interrupt pins as claimed in claim 1, wherein the slots comprises one of peripheral component interconnect (PCI) bus slots, peripheral component interconnect express (PCI-E) bus slots, and industry standard architecture (ISA) bus slots.

* * * * *